US012017236B2

(12) United States Patent
Schulte

(10) Patent No.: US 12,017,236 B2
(45) Date of Patent: Jun. 25, 2024

(54) CEILING SHOWER WITH AT LEAST A FIRST HOUSING ELEMENT AND A SECOND HOUSING ELEMENT

(71) Applicant: Grohe AG, Hemer (DE)

(72) Inventor: Michael Schulte, Menden (DE)

(73) Assignee: GROHE AG, Hemer (DE)

(*) Notice: Subject to any disclaimer, the term of this patent is extended or adjusted under 35 U.S.C. 154(b) by 94 days.

(21) Appl. No.: 17/541,637

(22) Filed: Dec. 3, 2021

(65) Prior Publication Data

US 2022/0176390 A1 Jun. 9, 2022

(30) Foreign Application Priority Data

Dec. 4, 2020 (DE) ........................ 102020132303.4

(51) Int. Cl.
*B05B 1/18* (2006.01)
*B05B 15/65* (2018.01)
*E03C 1/04* (2006.01)

(52) U.S. Cl.
CPC ................ *B05B 1/18* (2013.01); *B05B 15/65* (2018.02); *E03C 1/0408* (2013.01)

(58) Field of Classification Search
CPC ................................. B05B 1/18; B05B 15/65
USPC ......................... 239/208, 209, 548, 556, 561
See application file for complete search history.

(56) References Cited

U.S. PATENT DOCUMENTS 1,430,620 A * 10/1922 Brauer .................. B05B 1/3426 239/269
3,081,950 A * 3/1963 Rinkewich ............ B05B 1/1654 239/394
3,892,277 A * 7/1975 Curran ................... A62C 37/10 169/51
2002/0130204 A1* 9/2002 Chao ......................... B05B 1/20 239/548

* cited by examiner

*Primary Examiner* — Christopher S Kim
(74) *Attorney, Agent, or Firm* — Wenderoth, Lind & Ponack, L.L.P.

(57) ABSTRACT

A ceiling-mount showerhead (1), at least comprising:
at least one first housing element (2) to attach to a ceiling (3), wherein a first spray plate (4) is disposed in the at least one first housing element (2); and
at least one second housing element (5) to attach to the ceiling (3), wherein a second spray plate (6) is disposed in the at least one second housing element (5).

20 Claims, 4 Drawing Sheets

CEILING SHOWER WITH AT LEAST A FIRST HOUSING ELEMENT AND A SECOND HOUSING ELEMENT

This invention relates to a ceiling-mount showerhead. Such ceiling-mount showerheads can be used for showers and bathtubs, which are used in particular for personal hygiene.

Showers or bathtubs may have a ceiling-mount showerhead that directs a spray from above onto a user of the shower while showering. Further, ceiling-mount showerheads for showers or bathtubs, which can be used to dispense a fluid in different spray patterns, for instance in the form of rain spray, full-body spray, massage spray or pearl spray are known. The changeover between the individual spray patterns can be performed using manually and/or electrically actuatable changeover elements at the ceiling-mount showerheads, for instance in the way of valves of solenoids. The changeover elements can be used to direct the fluid to the relevant spray plates to form the desired spray patterns. To control or change a desired spray pattern, control elements may be provided to permit a user of the ceiling-mount showerhead to set the desired spray pattern. A shape of the ceiling-mount showerhead, size of the ceiling-mount showerhead and/or the spray patterns that can be delivered by the ceiling-mount showerhead is/are predefined at the factory. The disadvantage is that the shape, size and/or spray patterns of the ceiling-mount showerhead can subsequently no longer be adapted to actual requirements.

Therefore the invention addresses the problem of solving at least a part of the issues described with reference to the prior art and, in particular, of providing a ceiling-mount showerhead, the shape, size and/or spray pattern to be delivered of which can be configured.

This problem is solved by a ceiling-mount showerhead according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A ceiling-mount showerhead having at least the characteristics listed below contributes thereto:

- at least one first housing element to attach to a ceiling, wherein a first spray plate is disposed in the at least one first housing element; and
- at least one second housing element to attach to the ceiling, wherein a second spray plate is disposed in the at least one second housing element.

The ceiling-mount showerhead can be used in particular for a shower or bathtub. Such showers or bathtubs can be used by a user, in particular, for the purpose of personal hygiene or therapeutic application. For this purpose, the shower or bathtub is regularly located in a sanitary facility, such as a bathroom. Furthermore, the shower or bathtub can also be used in facilities having bathing/swimming equipment, such as saunas, whirlpools, swimming pools and so on. In particular, the ceiling-mount showerhead can be at least partially attached in and/or to an upper ceiling, which is in particular the ceiling of a room, a building or the like. In particular, the ceiling-mount showerhead can be/is (only) suspended from the ceiling. Typically, the ceiling extends horizontally. Furthermore, the ceiling-mount showerhead can also be arranged on a wall, which can extend in a vertical direction, for instance. A water inlet of the ceiling-mount showerhead may be oriented at least partially (approximately) in parallel and/or orthogonal to the direction of the water jet emitted. For the arrangement of the ceiling-mount showerhead, a matching installation space, for instance in the form of an opening, can be provided in the ceiling or wall. The ceiling-mount showerhead is used to dispense a fluid, in particular water. Further, the ceiling-mount showerhead is particularly a ceiling-mount showerhead that can be used to dispense the liquid onto a user from above.

The ceiling-mount showerhead has at least one first housing element that can be attached to and/or at least partially mounted in the ceiling. The at least one first housing element is used to mount a first spray plate through which the liquid can be dispensed in a first spray pattern. Furthermore, the at least one first housing element can be used to mount further functional elements and/or fluid lines, etc. For this purpose, the at least one first housing element has, in particular, a first mounting space, in which the first spray plate, the functional element and/or the fluid line can be secured. In particular, the first mounting space is designed in such a way that no liquid or moisture can enter the ceiling from the at least one first housing element. The at least one first housing element may have at least one first fluid supply spot. The at least one first fluid supply spot is an area of the at least one first housing element that is provided and/or prepared for supplying the fluid. The liquid can be supplied, in particular, from a public water-supply network. In particular, the at least one first fluid supply spot may be provided at a shell and/or ceiling wall of the at least one first housing element. Further, the at least one first housing element may have at least two first fluid supply spots for supplying cold water and/or hot water. The cold water and the hot water can then be mixed, for instance, by the functional element or the first spray plate to form a mixed water having a desired mixed-water temperature. Alternatively, the mixed water may be mixable by at least one plumbing fixture, at least one mixing valve, at least one thermostatic mixing valve, at least one mixing cartridge, and/or at least one thermostatic mixing cartridge. The mixed water can subsequently be supplied to the at least one first housing element via at least one mixed-water line. In this case, the at least one first housing element requires in particular only one (single) first liquid supply spot (for the mixed water). In addition, provision may be made for mixed water from a separate plumbing fixture, mixing valve, thermostatic mixing valve, mixing cartridge, and/or thermostatic mixing cartridge to be supplied to each first housing element. In an original state of the at least one first housing element, the at least one first liquid supply spot is in particular closed (liquid-tight). When installing the ceiling-mount showerhead, the at least one first fluid supply spot may be opened, for instance by drilling a hole, provided that this is required for the particular configuration of the ceiling-mount showerhead. In addition, the at least one first fluid supply spot may have a predetermined breaking point for opening the at least one first fluid supply spot. For attaching the at least one first housing element, the at least one first housing element may have at least one first attachment point. In the original state of the at least one first housing element, the at least one first attachment point may in particular be closed (liquid-tight). When installing the ceiling-mount showerhead, the at least one first attachment point may be opened, for instance by drilling a hole, provided that this is required to attach the ceiling-mount showerhead in the particular configuration. The at least one first attachment point is disposed in particular in a first ceiling wall of the at least one first housing element. In particular, the first ceiling wall represents an upper outer exterior wall of the ceiling-mount showerhead in the assembled state of the ceiling-mount showerhead. Further, the first ceiling wall may at least partially delimit the first mounting space. After opening the at least one first attachment point, the at least one first housing element can be attached to the ceiling, for instance, using a screw or bolt connection. Furthermore, a seal can be provided at the at least one first attachment point to prevent liquid or moisture from escaping from the first housing element into the ceiling. The at least one first housing element may be at least partially made of plastic and/or metal. Furthermore, the at least one first housing element can be designed, in particular, in the manner of a plastic die-cast component. The first mounting space may be covered by a first cover having at least one passage opening for the liquid. The first spray plate can deliver the liquid to an environment via the at least one passage opening. Further, the first spray plate may extend at least partially through the at least one passage opening into the environment. In particular, the first cover can be designed to be at least partially flat and/or plate-shaped. In the installed state of the ceiling-mount showerhead, the first cover may, for instance, form a lower exterior wall of the ceiling-mount showerhead and/or be (largely) flush with the ceiling. Furthermore, the first cover may be at least partially made of metal or plastic. Further, the first cover may have a chrome-plated and/or decorative outer surface. In addition, the first cover may be attached to the at least one first housing element, for instance, magnetically or by a clip connection. For this purpose, a magnet can be arranged on the at least one first housing element, for instance. In particular, the first cover can be rectangular or square in shape.

In addition, the ceiling-mount showerhead has at least a second housing element that can be attached to and/or at least partially mounted in the ceiling. The at least one second housing element is used to mount a second spray plate through which the liquid can be dispensed in a second spray pattern. The second spray plate may be identical to or different from the first spray plate. Thus, the second spray pattern can also be identical or different from the first spray pattern. Furthermore, the at least one second housing element can also be used to mount further functional elements and/or fluid lines, etc. For this purpose, the at least one second housing element has, in particular, a second mounting space, in which the second spray plate, the functional element and/or the fluid line can be secured. In particular, the second mounting space is designed in such a way that no liquid or moisture can enter the ceiling from the at least one second housing element. The at least one second housing element may have at least one second fluid supply spot. The at least one second fluid supply spot is an area of the at least one second housing element that is provided and/or prepared for supplying the fluid. The liquid can be supplied, in particular, from a public water-supply network. In particular, the at least one second supply spot may be provided at a shell and/or ceiling wall of the at least one second housing element. Further, the at least one second housing element may have at least two second fluid supply spots for supplying cold water and/or hot water. The cold water and the hot water can then be mixed, for instance, by the functional element or the second spray plate to form the mixed water having a desired mixed-water temperature. Alternatively, the mixed water may be mixable by the at least one plumbing fixture, the at least one mixing valve, the at least one thermostatic mixing valve, the at least one mixing cartridge, and/or the at least one thermostatic mixing cartridge. The mixed water can subsequently be supplied to the at least one second housing element via the at least one mixed-water line. In this case, the at least one second housing element requires in particular only one (single) second liquid supply spot (for the mixed water). In addition, provision may be made for mixed water from a separate plumbing fixture, mixing valve, thermostatic mixing valve, mixing cartridge, and/or thermostatic mixing cartridge to be supplied to each second housing element. In an original state of the at least one second housing element, the at least one second liquid supply spot is in particular closed (liquid-tight). When installing the ceiling-mount showerhead, the at least one second fluid supply spot may be opened, for instance by drilling a hole, provided that this is required for the particular configuration of the ceiling-mount showerhead. In addition, the at least one second fluid supply spot may have a predetermined breaking point for opening the at least one second fluid supply spot. The at least one second housing element may have at least one second attachment point for attaching the at least one second housing element. In the initial state of the at least one second housing element, the at least one attachment point may in particular be closed (liquid-tight). When installing the ceiling-mount showerhead, the at least one second attachment point may be opened, for instance by drilling a hole, provided that this is required to attach the ceiling-mount showerhead in the particular configuration. The at least one second attachment point is disposed, in particular, in a second ceiling wall of the at least one second housing element. In particular, the second ceiling wall represents an upper outer exterior wall of the ceiling-mount showerhead in the assembled state of the ceiling-mount showerhead. Further, the second ceiling wall may at least partially delimit the second mounting space. After opening the at least one second attachment point, the at least one second housing element can be attached to the ceiling, for instance, using a screw or bolt connection. Furthermore, a seal can be provided at the at least one second attachment point to prevent liquid or moisture from escaping from the second housing element into the ceiling. The at least one second housing element may be at least partially made of plastic and/or metal. Furthermore, the at least one second housing element can be designed to be, in particular, in the manner of a plastic die-cast component. The second mounting space may be covered by a second cover having at least one passage opening for the liquid. The second spray plate can deliver the liquid to an environment via the at least one passage opening. Further, the second spray plate may extend at least partially through the at least one passage opening into the environment. In particular, the second cover can be at least partially flat and/or plate-shaped. In the installed state of the ceiling-mount showerhead, the second cover may, for instance, form a lower exterior wall of the ceiling-mount showerhead and/or be (largely) flush with the ceiling. Furthermore, the second cover may be at least partially made of metal or plastic. Further, the second cover may have a chrome-plated and/or decorative outer surface. In addition, the second cover may be attached to the at least one second housing element, for instance, magnetically or by a clip connection. For this purpose, a magnet can be arranged on the at least one second housing element, for instance. In particular, the second cover can be rectangular or square in shape.

The at least one first housing element and the at least one second housing element may be designed to be identical or different. In particular, the at least one first housing element and the at least one second housing element may differ in size. For instance, the at least one first housing element may have a first length of 5 cm to 50 cm, a first width of 5 cm to 50 cm, and/or a first depth of 4 cm to 20 cm. Further, the at least one second housing element may have a second length of 5 cm to 50 cm, a second width of 5 cm to 50 cm, and/or a second depth of 4 cm to 20 cm. The first depth of the at least one first housing element and the second depth of the at least one second housing element may in particular be designed to be identical. Depending on the desired shape and/or size, the ceiling-mount showerhead can be composed of a suitable number of first housing elements and a suitable number of second housing elements. For this purpose, an installer can interconnect the at least one first housing element and the at least one second housing element during the installation of the ceiling-mount showerhead on the ceiling or (shortly) before the installation of the ceiling-mount showerhead on the ceiling. The connection of the at least one first housing element and the at least one second housing element can be made, for instance, by a screw/bolt connection, plug connection and/or adhesive connection. The at least one first housing element and the at least one second housing element can be interconnected, in particular at their shells. Furthermore, the at least one first housing element and the at least one second housing element can be interconnected in such a way that the at least one first housing element and the at least one second housing element are arranged next to each other and/or not on top of each other after installing the ceiling-mount showerhead on the ceiling. The number of first housing elements and the number of second housing elements can also be adapted to a shape and/or a size of an area of the ceiling-mount showerhead via which the fluid can be dispensed by the ceiling-mount showerhead. For instance, the number of first housing elements and/or the number of second housing elements may be 1 to 10. In addition, the ceiling-mount showerhead may be expanded by at least one additional housing element, for instance, a third housing element, a fourth housing element, or a fifth housing element, etc. The at least one further housing element can differ from the at least one first housing element and/or at least one second housing element in particular only by its size. Incidentally, the at least one further housing element may be designed to match the at least one first housing element and/or the at least one second housing element. When installing the ceiling-mount showerhead, the at least one first housing element, the at least one second housing element and/or, if applicable, the at least one further housing element can first be attached to and/or at least partially mounted in the ceiling and then the spray plates can be arranged in the respective housing elements. After connecting the spray plates to at least one supply line for the liquid, the housing elements can be covered by matching covers such that the housing elements are no longer visible when the ceiling-mount showerhead is in use.

The at least one first housing element or the at least one second housing element may be cup-shaped. In particular, this can mean that the at least one first housing element and/or the at least one second housing element has/have an opening, in particular in the direction of an underside of the ceiling-mount showerhead and/or in the direction of a liquid discharge surface of the ceiling-mount showerhead. In particular, the opening may extend across an entire cross-section of the at least one first housing element and/or the at least one second housing element. Furthermore, the opening may be designed to be opposite from the ceiling wall of the at least one first housing element and/or the at least one second housing element. Furthermore, the opening can extend in parallel to the ceiling wall. In particular, the first mounting space of the at least one first housing element and/or the second mounting space of the at least one second housing element is accessible via the opening, such that the first spray plate can be arranged in the first mounting space and/or the second spray plate can be arranged in the second mounting space via the opening. The at least one first housing element and/or the at least one second housing element may have a wall thickness of, for instance, 1 mm to 10 mm. Wall thickness can be defined to mean, in particular, a thickness of the top wall and/or the shell(s).

The at least one first housing element or the at least one second housing element may be at least partially rectangular in shape. In particular, a cross-section of the at least one first housing element and/or the at least one second housing element may be rectangular in shape. In particular, the cross-section can extend in parallel to the ceiling wall. Furthermore, the at least one first housing element and/or the at least one second housing element or the cross-section of the at least one first housing element and/or of the at least one second housing element may be square in shape. In particular, this may mean that the first length and the first width of the at least one first housing element and/or the second length and the second width of the at least one second housing element are of equal length. In particular, the at least one first housing element may be square and the at least one second housing element may be rectangular. In particular, the first length, first width and second length can be of equal length.

The at least one first housing element and the at least one second housing element may be attached to each other. The attachment of the at least one first housing element and the at least one second housing element can in particular be (non-destructively) detachable.

At least one spacer may be disposed between the at least one first housing element and the at least one second housing element. The at least one spacer permits the at least one housing element and the at least one second housing element to be kept at a defined distance from each other. For instance, the distance may have the form of a gap between the at least one first housing element and the at least one second housing element. The distance or a gap width of the gap can be, for instance, 1 mm to 20 mm, preferably 4 mm to 6 mm. The distance can be used to compensate for manufacturing tolerances and thus exact alignment of the at least one first housing element and the at least one second housing element with respect to each other.

The at least one spacer can be tubular in shape. In this context, the at least one spacer can have a spacer length of, for instance, 5 mm to 50 mm and/or an outer diameter of 5 mm to 20 mm, in particular along its longitudinal axis. Furthermore, the at least one spacer can have an inner diameter of 3 mm to 18 mm, for instance. A connecting means may extend through the spacer to connect the at least one first housing element to the at least one second housing element. The connecting means can be a screw/bolt, for instance.

The at least one spacer may extend into a first connection opening of the at least one first housing element and into a second connection opening of the at least one second housing element. For this purpose, the at least one first housing element has at least one first connection opening, in particular in a shell. Furthermore, the at least one first housing element can have at least one first connection opening, in particular in each shell. In addition, the at least one second housing element can have at least one second connection opening, in particular in a shell. Furthermore, the at least one second housing element can have at least one second connection opening, in particular in each shell. In the original state of the at least one first housing element and/or the at least one second housing element, the connecting openings may be closed to prevent liquid or moisture from escaping from the mounting spaces. When installing the ceiling-mount showerhead, only those connection openings are opened, for instance by drilling a hole, which are required for the configuration of the ceiling-mount showerhead to be produced or in which the at least one spacer is to be arranged. A tubular mount for the at least one spacer can be disposed in the area of the at least one first connection opening and/or in the area of the at least one second connection opening. In particular, the tubular mount may extend outwards from a shell of the first housing element and/or of the second housing element. In particular each of its two longitudinal ends of the at least one spacer can be (partially) inserted into the tubular mount. Furthermore, the at least one spacer can have at least one seal by means of which, in particular, moisture can be prevented from escaping into the ceiling or wall. The at least one seal can, for instance, be designed in the form of an O-ring. In addition, the at least one spacer may have at least one groove, in which the at least one seal is disposed.

A gap between the at least one first housing element and the at least one second housing element may be sealed by a housing seal. The housing seal can be used in particular to prevent liquid and/or moisture from entering the ceiling through the gap. For this purpose, the housing seal can extend in particular along the entire gap and/or across all gaps.

The housing seal can be designed in the way of a sealing tape. The sealing tape may be a film, for instance, which may be self-adhesive, for instance. The sealing tape can have a (tape) width of, for instance, 5 mm to 100 mm.

The housing seal may be at least partially disposed on a first frame of the at least one first housing element or on a second frame of the at least one second housing element. In particular, the first frame extends around the opening of the at least one first housing element and/or the second frame extends around the opening of the at least one second housing element. Further, the first frame and/or the second frame may extend outwards from the opening. The first frame and/or the second frame may have a (frame) width of, for instance, 1 mm to 20 mm. Furthermore, the (frame) width may be dimensioned in particular in parallel to the ceiling wall of the first housing element and/or of the second housing element.

The invention and the technical environment are explained in more detail below with reference to the figures. It should be noted that the figures show particularly preferred variants of the embodiment of the invention, but the invention is not limited thereto. The same reference signs are used for the same components in the figures. In an exemplary and schematic manner FIG. 1 shows a first variant of the embodiment of a ceiling-mount showerhead;

Figure 1:
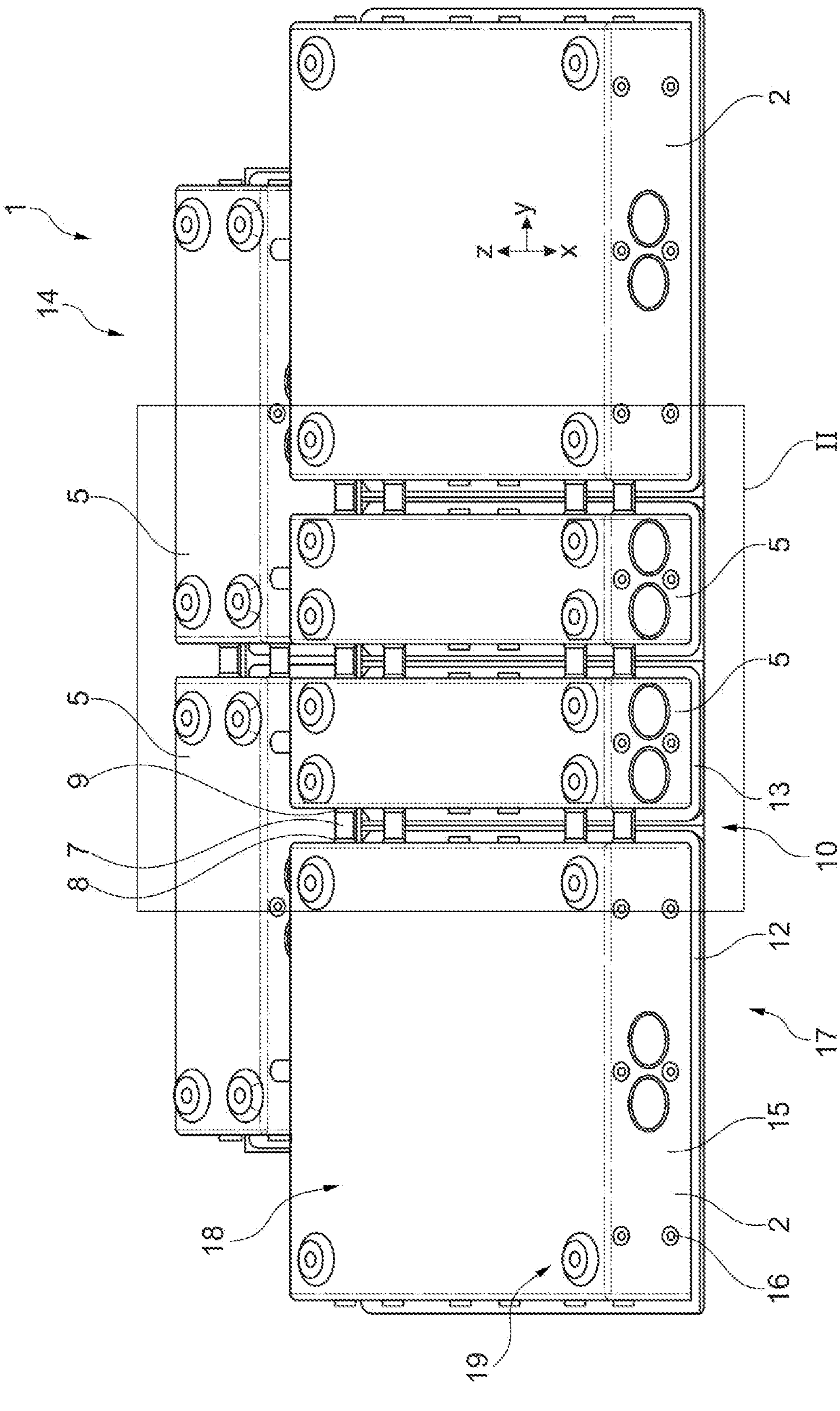

FIG. 1 shows a perspective view of a first variant of the embodiment of a ceiling-mount showerhead 1 viewed in the direction of a top face 14 of the ceiling-mount showerhead 1. The ceiling-mount showerhead 1 comprises two identically formed first housing elements 2 and four identically formed second housing elements 5. The first housing elements 2 are square and the second housing elements 5 are rectangular. Furthermore, tubular spacers 7 are used to space the first housing elements 2 and the second housing elements 5 apart such that a gap 10 is formed between each of the housing elements 2, 5. The spacers 7 each extend into a first connection opening 8 in the first housing elements 2 and into a second connection opening 9 in the second housing elements 5. The shells 15 of the housing elements 2, 5 have tubular mounts 16 for the spacers 7. In an initial state of the housing elements 2, 5 or before the housing elements 2, 5 are connected, the mounts 16 are closed. When installing the housing elements 2, 5, only those mounts 16 in which a spacer 7 is to be arranged are opened, for instance by drilling a hole. Screws/bolts not visible here extend through the spacers 7 (and seals 46, 47 shown in FIG. 8) by means of which the housing elements 2, 5 are interconnected. The housing elements 2, 5 each have four attachment points 19 in their ceiling walls 18, which are used to attach the ceiling-mount showerhead 1 to a ceiling 3 shown in FIGS. 7 and 8. The attachment points 19 can also be closed in the original state of the housing elements 2, 5, but that is not mandatory. When attaching the ceiling-mount showerhead 1 to the ceiling 3, the required attachment points 19 are opened, for instance by drilling a hole, such that the ceiling-mount showerhead 1 can then be attached to the ceiling 3 using screws/bolts not shown here. The first housing elements 2 each have a circumferential first frame 12 on their undersides 17, and the second housing elements 5 each have a circumferential second frame 13 on their undersides 17.

Figure 2:
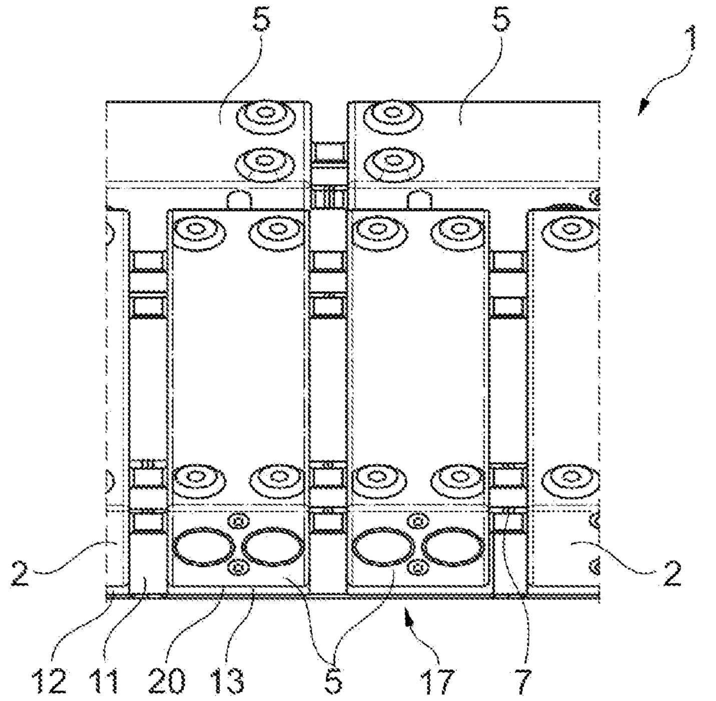
FIG. 2 shows a partial view of the first variant of the embodiment of the ceiling-mount showerhead.

FIG. 2 shows an area of the first variant of the embodiment of the ceiling-mount showerhead 1 marked “II” in FIG. 1 after a housing seal 11 has been used to seal the gaps 10 between the housing elements 2, 5 shown in FIG. 1. In this case, the housing seal 11 is formed in the manner of a sealing tape which is bonded to a rear end 20 of the frames 12, 13. The housing seal 11 prevents moisture from the underside 17 of the ceiling-mount showerhead 1 from passing through the gaps 10 between the housing elements 2, 5 shown in FIG. 1.

Figure 3:
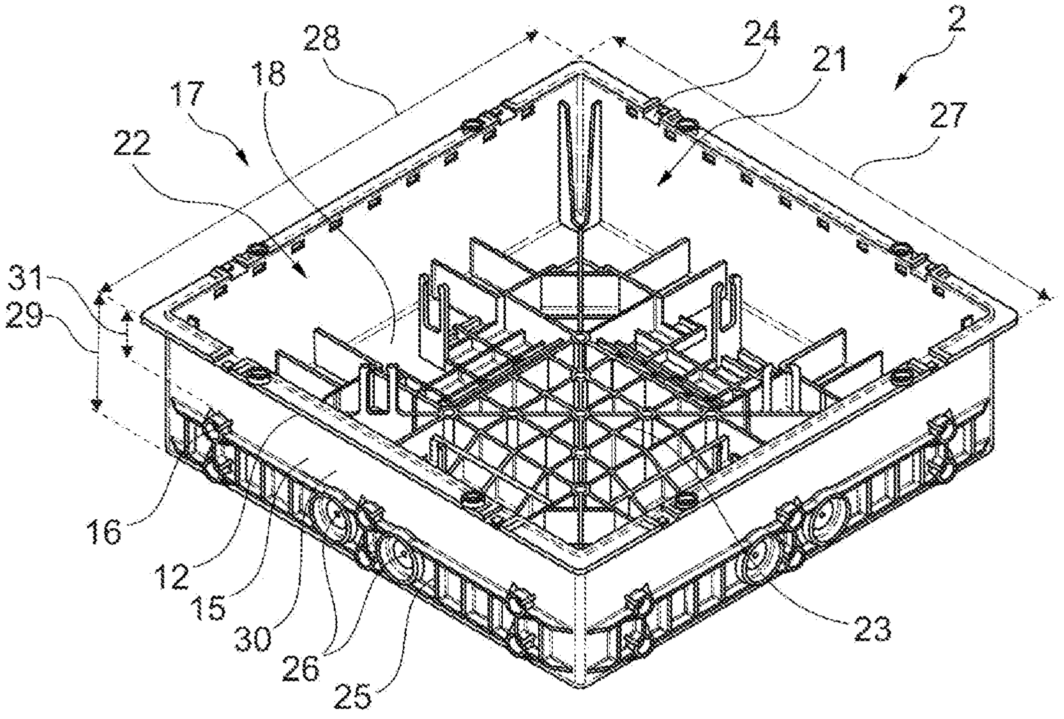
FIG. 3 shows a first housing element of the first variant of the embodiment of the ceiling-mount showerhead.

FIG. 3 shows a perspective view of one of the two first housing elements 2 of the first variant of the embodiment of the ceiling-mount showerhead 1 shown in FIGS. 1 and 2 viewed in the direction of the underside 17 of the first housing element 2. The first housing element 2 is cup-shaped and has a first mounting space 21, which is accessible via a first opening 22. The first opening 22 extends across the entire underside 17 of the first housing element 2.

Within the first mounting space 21, first reinforcing structures 23 are formed on the ceiling wall 18 to increase the stability of the ceiling wall 18. In addition, first attachment structures 24 are formed at the first housing element 2, to which attachment structures a first spray plate 4 (shown in FIGS. 7 and 8) can be attached. A cover (not shown) can be used to cover the first opening 22. The cover may have at least one passage opening through which the first spray plate 4 can dispense a liquid. In addition, second reinforcing structures 25 are formed on the shells 15, which reinforcing structures are not shown in FIGS. 1 and 2 for reasons of simplification and which reinforcing structures are used to reinforce the shells 15. Liquid supply spots 26, through which liquid supply lines, such as cold-water lines and/or hot-water lines, can be routed are also formed on the shells 15. The fluid supply spots 26 are closed in the initial state of the first housing element 2 shown here and can be opened if necessary, for instance by drilling a hole. The first housing element 2 has a first length 27, a first width 28, and a first depth 29. The first length 27 and the first width 28 are of equal length, resulting in the first housing element 2 having a square cross-section. In addition, a circumferential first area 30 extends from the first frame 12 to the mounts 16 and is smooth, without openings and without structures, such that the housing seal 11 shown in FIG. 2 having the form of a sealing tape can extend into the area 30 or be bonded to the area 30. The first area 30 has a first height 31 starting from the first frame 12. For instance, the first height 31 may be 5 mm to 50 mm, preferably 25 mm to 35 mm.

Figure 4:
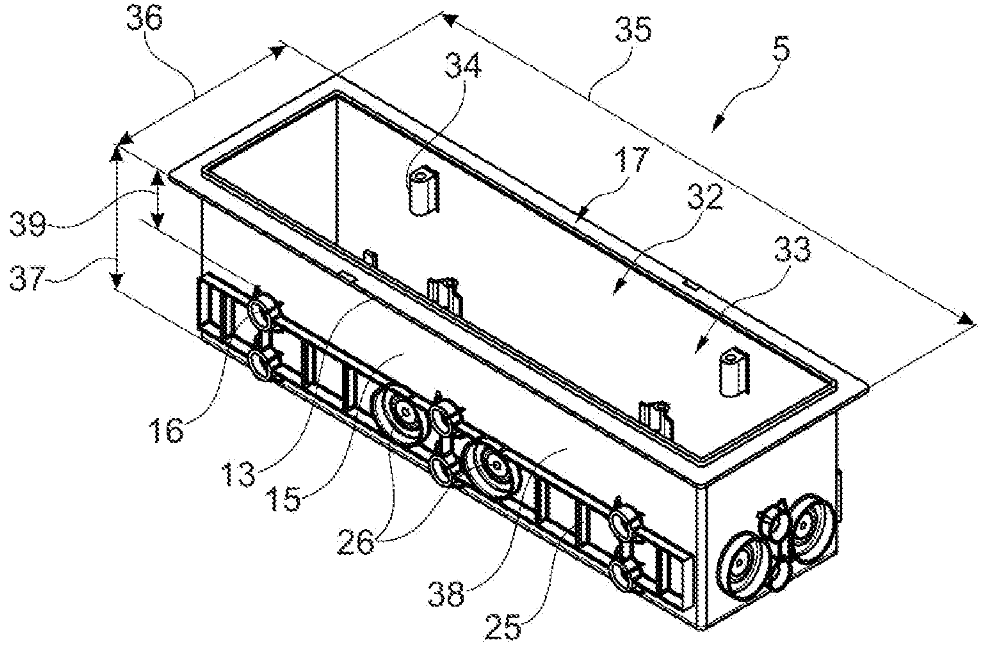
FIG. 4 shows a second housing element of the second variant of the embodiment of the ceiling-mount showerhead.

FIG. 4 shows a perspective view of one of the four second housing elements 5 of the first variant of the embodiment of the ceiling-mount showerhead 1 shown in FIGS. 1 and 2 viewed in the direction of the underside 17 of the second housing element 5. The second housing element 5 is also cup-shaped and has a second mounting space 32, which is accessible via a second opening 33. The second opening 33 extends across the entire underside 17 of the second housing element 5. Second attachment structures 34 are formed in the second mounting space 32, to which second attachment structures a second spray plate 6 shown in FIG. 8 can be attached. A cover (not shown) can be used to cover the second opening 33. The cover may have at least one passage opening through which the second spray plate 6 can dispense a liquid. In addition, second reinforcing structures 25 are formed on the shells 15, which reinforcing structures are not shown in FIGS. 1 and 2 for reasons of simplification and which reinforcing structures are used to reinforce the shells 15. Liquid supply spots 26, through which liquid supply lines, such as cold-water lines and/or hot-water lines, can be routed are also formed on the shells 15. The fluid supply spots 26 are closed in the initial state of the second housing element 5 shown here and can be opened if necessary, for instance by drilling a hole. The second housing element 5 has a second length 35, a second width 36, and a second depth 37. The second length 35 is greater than the second width 36, resulting in the second housing element 5 having a rectangular cross-section. In addition, a circumferential second area 38 extends from the second frame 13 to the mounts 16 and is smooth, without openings and without structures, such that the housing seal 11 shown in FIG. 2 having the form of a sealing tape can extend into the area 38 or be bonded to the area 38. The second area 38 has a second height 39 starting from the second frame 13. For instance, the second height 39 may be 5 mm to 50 mm, preferably 25 mm to 35 mm.

Figure 5:
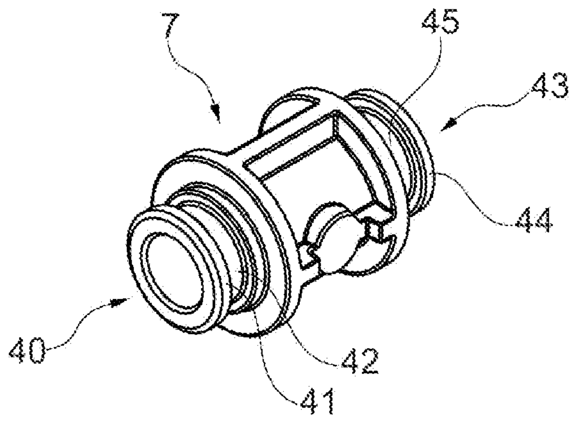
FIG. 5 shows a perspective view of a spacer of the first variant of the embodiment of the ceiling-mount showerhead.

FIG. 5 shows a perspective view of one of the spacers 7 shown in FIGS. 1 and 2. The spacer 7 has a first connection section 41 having a first groove 42 at a first longitudinal end 40, and a second connection section 44 having a second groove 45 at a second longitudinal end 43.

Figure 6:
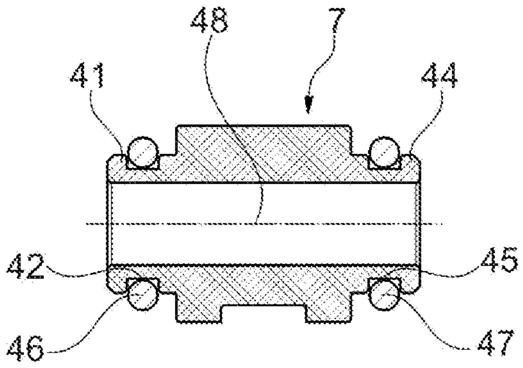
FIG. 6 shows a longitudinal section the spacer of the first variant of the embodiment of the ceiling-mount showerhead.

FIG. 6 shows a longitudinal section of the spacer 7 after a first seal 46 has been arranged in the first groove 42 and a second seal 47 has been arranged in the second groove 45. The first seal 46 and the second seal 47 are each formed in the manner of an O-ring. The connection sections 41, 44 of the spacer 7 can be inserted into the mounts 16 of the housing elements 2, 5 shown in FIGS. 1 to 4. In so doing, the seals 46, 47 seal an annular gap between the connection sections 41, 44 and the mounts 16 preventing moisture from escaping from the mounting spaces 21, 32 of the housing elements 2, 5 (cf. FIGS. 3 and 4) into the ceiling 3.

Furthermore, it can be seen in FIG. 6 that the spacer 7 is tubular in shape and extends along a longitudinal axis 48.

Figure 7:
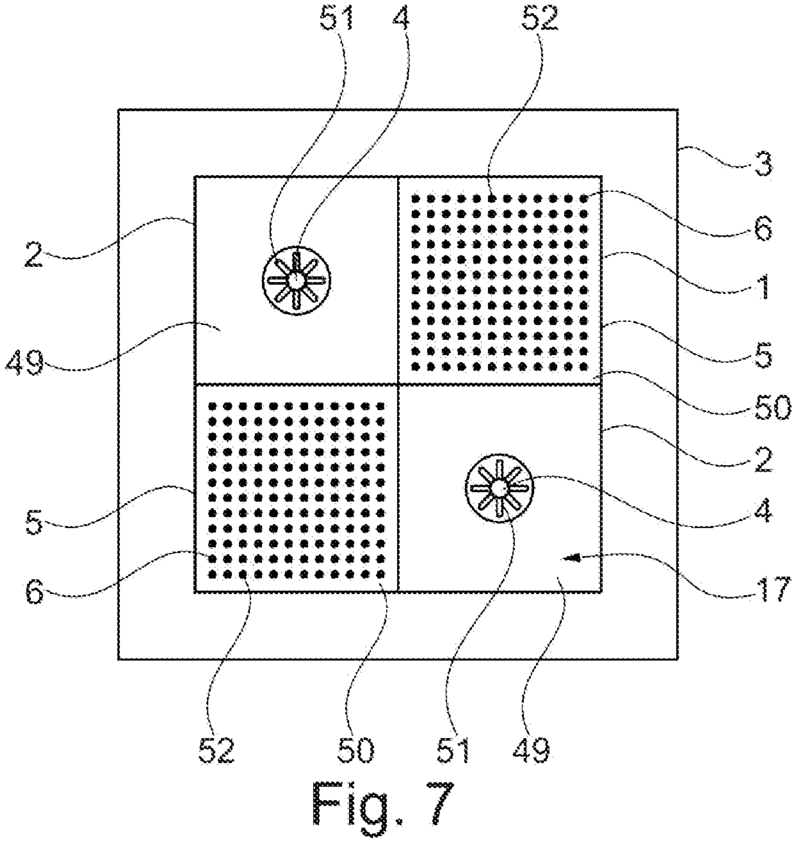
FIG. 7 shows a second variant of the embodiment of the ceiling-mount showerhead.

FIG. 7 shows a second variant of the embodiment of the ceiling-mount showerhead 1, viewed in the direction of the underside 17. In contrast to the first variant of the embodiment of the ceiling-mount showerhead 1, the second variant of the embodiment of the ceiling-mount showerhead 1 has two first housing elements 2 having two first spray plates 4 and two second housing elements 5 having two second spray plates 6. The housing elements 2, 5 are mounted in the ceiling 3, are designed identical to the first housing element 2 of the first variant of the embodiment of the ceiling-mount showerhead 1 shown in FIG. 3 and are interconnected in a 2×2 configuration using the spacers 7 shown in FIGS. 5 and 6. The first covers 49 cover the first spray plates 4 arranged in the first housing elements 2 and the second covers 50 cover the second spray plates 6 arranged in the second housing elements 5. The first covers 49 have first passage openings 51 that are adapted to the first spray plates 4 such that the first spray plates 4 can dispense a liquid via the first passage openings 51. The second covers 50 have second passage openings 52 that are adapted to the second spray plates 6 such that the second spray plates 6 can also dispense a liquid via the second passage openings 52.

Figure 8:
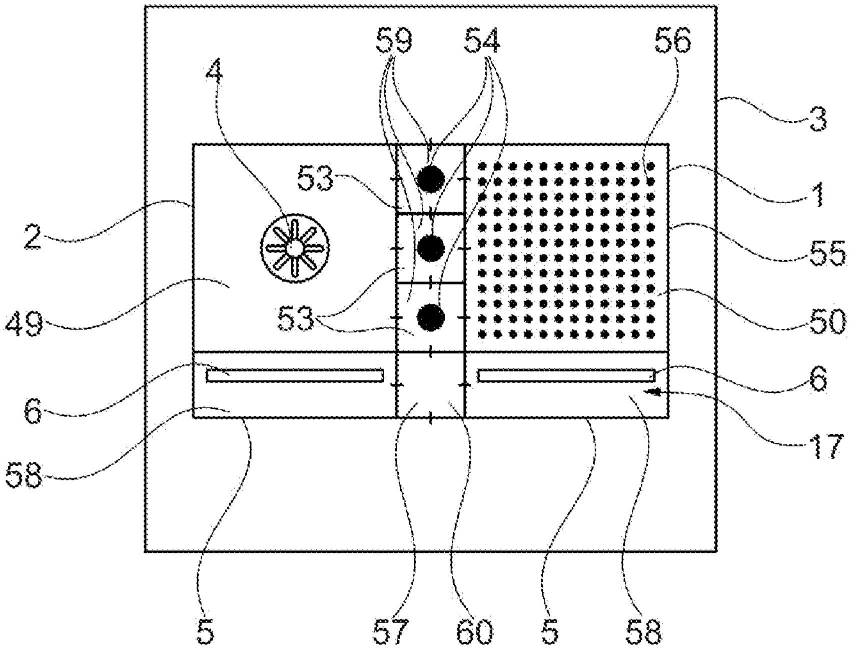
FIG. 8: a third variant of the embodiment of the ceiling-mount showerhead.

FIG. 8 shows a third variant of the embodiment of the ceiling-mount showerhead 1, viewed in the direction of the underside 17. In contrast to the first and second variants of the embodiment of the ceiling-mount showerhead 1, the third variant of the embodiment of the ceiling-mount showerhead 1 has a first housing element 2 having a first spray plate 4, two second housing elements 5 each having a second spray plate 6, three third housing elements 53 each having a third spray plate 54, a fourth housing element 55 having a fourth spray plate 56, and a fifth housing element 57 without a spray plate. The housing elements 2, 5, 53, 55, 57 are mounted in the ceiling 3. The first housing element 2 and the fourth housing element 55 are formed identically to the first housing element 2 of the first variant of the embodiment of the ceiling-mount showerhead 1 shown in FIG. 3. The two second housing elements 5 are formed identically to the second housing element 5 of the first variant of the embodiment of the ceiling-mount showerhead 1 shown in FIG. 4. Compared to the first housing element 2 of the first variant of the embodiment of the ceiling-mount showerhead 1 shown in FIG. 3, the three third housing elements 53 and the fifth housing element 57 are formed having a smaller length and width. The housing elements 2, 5, 53, 55, 57 are covered with a first cover 49, second covers 50, third covers 58, fourth covers 59 and a fifth cover 60, the passage opening of which is adapted to the respective spray plates 4, 6, 54, 56 such that the spray plates 4, 6, 54, 56 can dispense the liquid through the passage opening.

This invention can be used to configure a shape, size, and/or deliverable spray patterns of the ceiling-mount showerhead.

LIST OF REFERENCE NUMERALS

1 ceiling-mount showerhead
2 first housing element
3 ceiling
4 first spray plate
5 second housing element
6 second spray plate

7 spacer
8 first connection opening
9 second connection opening
10 gap
11 housing seal
12 first frame
13 second frame
14 top face
15 shell
16 mount
17 underside
18 ceiling wall
19 attachment point
20 rear end
21 first mounting space
22 first opening
23 first reinforcement structure
24 first attachment structure
25 second reinforcement structure
26 fluid supply spot
27 first length
28 first width
29 first depth
30 first area
31 first height
32 second mounting space
33 second opening
34 second attachment structure
35 second length
36 second width
37 second depth
38 second area
39 second height
40 first longitudinal end
41 first connection section
42 first groove
43 second longitudinal end
44 second connection section
45 second groove
46 first seal
47 second seal
48 longitudinal axis
49 first cover
50 second cover
51 first passage opening
52 second passage opening
53 third housing element
54 third spray plate
55 fourth housing element
56 fourth spray plate
57 fifth housing element
58 third cover
59 fourth cover
60 fifth cover

The invention claimed is:

1. A ceiling-mount showerhead (1) for personal hygiene, the ceiling-mount showerhead (1) comprising:

at least one first housing element (2) attachable to a ceiling (3), the at least one first housing element (2) comprising a first attachment point (19) attachable to the ceiling (3), at least two fluid supply spots (26) and a first spray plate (4), wherein the at least two fluid supply spots (26) are water inlets, wherein the first spray plate (4) is disposed in the at least one first housing element (2), and water is dispensable in a first spray pattern through the first spray plate (4);

at least one second housing element (5) attachable to the ceiling (3), the at least one second housing element (5) comprising a second attachment point attachable to the ceiling (3) and a second spray plate (6), wherein the second spray plate (6) is disposed in the at least one second housing element (5), and the water is dispensable in a second spray pattern through the second spray plate different from the first spray pattern; and a control element to permit a user of the ceiling-mount showerhead (1) to set a desired spray pattern, wherein the desired spray pattern comprises at least one of the first spray pattern and the second spray pattern.

2. The ceiling-mount showerhead (1) for personal hygiene according to claim 1, wherein at least one of the at least one first housing element (2) and the at least one second housing element (5) is cup-shaped.

3. The ceiling-mount showerhead (1) for personal hygiene according to claim 1, wherein at least one of the at least one first housing element (2) and the at least one second housing element (5) is at least partially rectangular in shape.

4. The ceiling-mount showerhead (1) for personal hygiene according to claim 1, wherein the at least one first housing element (2) and the at least one second housing element (5) are attached to each other.

5. The ceiling-mount showerhead (1) for personal hygiene according to claim 1, further comprising at least one spacer (7) arranged between the at least one first housing element (2) and the at least one second housing element (5).

6. The ceiling-mount showerhead (1) for personal hygiene according to claim 5, wherein the at least one spacer (7) is tubular in shape.

7. The ceiling-mount showerhead (1) for personal hygiene according to claim 5, wherein the at least one spacer (7) extends into a first connection opening (8) of the at least one first housing element (2) and into a second connection opening (9) of the at least one second housing element (5).

8. The ceiling-mount showerhead (1) for personal hygiene according to claim 1, further comprising a gap (10) between the at least one first housing element (2) and the at least one second housing element (5) sealed by a housing seal (11).

9. The ceiling-mount showerhead (1) for personal hygiene according to claim 8, wherein the housing seal (11) is designed in a manner of a sealing tape.

10. The ceiling-mount showerhead (1) for personal hygiene according to claim 8, wherein the housing seal (11) is arranged at least partially on a first frame (12) of the at least one first housing element (2) or on a second frame (13) of the at least one second housing element (5).

11. The ceiling-mount showerhead (1) for personal hygiene according to claim 1, wherein the at least one first housing element (2) comprises two first housing elements (2).

12. The ceiling-mount showerhead (1) for personal hygiene according to claim 1, wherein the at least one second housing element (5) comprises two second housing elements (5).

13. The ceiling-mount showerhead (1) for personal hygiene according to claim 1, wherein the at least one first housing element (2) comprises two first housing elements (2), and wherein the at least one second housing element (5) comprises two second housing elements (5).

14. The ceiling-mount showerhead (1) for personal hygiene according to claim 1, further comprising:

at least one third housing element (53) attachable to the ceiling (3) and comprising a third spray plate (54), wherein the third spray plate (54) is disposed in the at least one third housing element (53), and the water is dispensable in a third spray pattern through the third spray plate (54), wherein the third spray pattern is different from the first spray pattern and the second spray pattern.

15. The ceiling-mount showerhead (1) for personal hygiene according to claim 14, wherein the desired spray pattern comprises at least one of the first spray pattern, the second spray pattern, and the third spray pattern.

16. The ceiling-mount showerhead (1) for personal hygiene according to claim 14, further comprising:

a fourth housing element (55) attachable to the ceiling (3) and comprising a fourth spray plate (56), wherein the fourth spray plate (56) is disposed in the fourth housing element (55), and the water is dispensable in a fourth spray pattern through the fourth spray plate (56), wherein the fourth spray pattern is different from the first spray pattern, the second spray pattern and the third spray pattern.

17. The ceiling-mount showerhead (1) for personal hygiene according to claim 16, wherein the desired spray pattern comprises at least one of the first spray pattern, the second spray pattern, the third spray pattern, and the fourth spray pattern.

18. The ceiling-mount showerhead (1) for personal hygiene according to claim 1, wherein the at least one second housing element (5) further comprises at least two fluid supply spots, and the at least two fluid supply spots are water inlets.

19. The ceiling-mount showerhead (1) for personal hygiene according to claim 1, wherein the first attachment point (19) is open, and the at least one first housing element (2) is attachable to the ceiling (3) with a screw or bolt connection.

20. The ceiling-mount showerhead (1) for personal hygiene according to claim 1, wherein the second attachment point is open, and the at least one second housing element (5) is attachable to the ceiling (3) with a screw or bolt connection.

* * * * *